United States Patent
Albou et al.

(10) Patent No.: US 10,072,811 B2
(45) Date of Patent: Sep. 11, 2018

(54) LIGHT DEVICE COMPRISING SURFACE LIGHT SOURCES

(71) Applicant: Valeo Vision, Bobigny (FR)

(72) Inventors: Pierre Albou, Paris (FR); Jean-Claude Puente, Livry Gargan (FR); Vincent Godbillon, Paris (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 14/969,320

(22) Filed: Dec. 15, 2015

(65) Prior Publication Data

US 2016/0178152 A1    Jun. 23, 2016

(30) Foreign Application Priority Data

Dec. 19, 2014  (FR) ..................... 14 62929

(51) Int. Cl.
| | |
|---|---|
| *F21V 9/00* | (2018.01) |
| *F21S 8/10* | (2006.01) |
| *B60Q 1/00* | (2006.01) |
| *B60Q 1/26* | (2006.01) |
| *F21S 41/141* | (2018.01) |
| *F21S 41/155* | (2018.01) |

(Continued)

(52) U.S. Cl.
CPC ........ *F21S 48/1163* (2013.01); *B60Q 1/0058* (2013.01); *B60Q 1/2607* (2013.01); *F21S 41/141* (2018.01); *F21S 41/155* (2018.01); *F21S 41/24* (2018.01); *F21S 43/14* (2018.01); *F21S 43/145* (2018.01); *F21S 43/239* (2018.01); *F21S 43/245* (2018.01); *F21S 43/249* (2018.01); *F21S 43/31* (2018.01); *F21Y 2105/00* (2013.01); *F21Y 2115/15* (2016.08)

(58) Field of Classification Search
CPC . B60Q 1/2607; B60Q 1/0058; F21S 48/1163; F21S 48/115; F21S 48/1241; F21S 48/215; F21S 48/217; F21S 48/2243; F21S 48/2268; F21S 48/2281; F21S 48/234; F21Y 2105/00; F21Y 2115/15
See application file for complete search history.

(56) References Cited

U.S. PATENT DOCUMENTS

| | | | |
|---|---|---|---|
| 6,639,349 B1 * | 10/2003 | Bahadur | F21K 9/00 313/483 |
| 7,111,970 B2 | 9/2006 | Gasquet | |

(Continued)

FOREIGN PATENT DOCUMENTS

| | | |
|---|---|---|
| DE | 202013105487 U1 | 1/2014 |
| DE | 202013105597 U1 | 2/2014 |

(Continued)

*Primary Examiner* — Y M. Lee
(74) *Attorney, Agent, or Firm* — Oblon, McClelland, Maier & Neustadt, L.L.P.

(57) ABSTRACT

A light device, notably for lighting and/or signaling, for a motor vehicle, suitable for emitting at least one first light beam and one second light beam, the device comprising a first surface light source and a second surface light source, in which: the first surface source is suitable for emitting first light rays (F1) toward the second surface source, the second surface source being arranged so that these first rays pass through it to participate in the first light beam, and the second surface source is suitable for emitting second light rays (F2), these second rays participating in the second light beam.

12 Claims, 1 Drawing Sheet

(51) Int. Cl.
*F21S 41/24* (2018.01)
*F21S 43/14* (2018.01)
*F21S 43/145* (2018.01)
*F21S 43/239* (2018.01)
*F21S 43/245* (2018.01)
*F21S 43/249* (2018.01)
*F21S 43/31* (2018.01)
*F21Y 105/00* (2016.01)
*F21Y 115/15* (2016.01)

(56) References Cited

U.S. PATENT DOCUMENTS

| | | |
|---|---|---|
| 7,278,768 B2 | 10/2007 | Gasquet |
| 9,074,744 B2 | 7/2015 | Tsukamoto |
| 9,400,347 B2 * | 7/2016 | Sugiyama ............ G02B 6/0011 |
| 2004/0136203 A1 | 7/2004 | Gasquet |
| 2007/0008736 A1 | 1/2007 | Gasquet |
| 2009/0067156 A1 * | 3/2009 | Bonnett ............... G02B 6/0068 |
| | | 362/97.2 |
| 2011/0170290 A1 * | 7/2011 | Hikmet .............. H05B 33/0863 |
| | | 362/235 |
| 2013/0106294 A1 * | 5/2013 | Rakuff .................... F21S 8/04 |
| | | 315/154 |
| 2014/0153273 A1 | 6/2014 | Tsukamoto |

FOREIGN PATENT DOCUMENTS

| | | |
|---|---|---|
| DE | 102013008192 A1 | 11/2014 |
| EP | 1434000 A2 | 6/2004 |
| EP | 2592332 A1 | 5/2013 |
| EP | 2738449 A1 | 6/2014 |
| JP | 2006196196 A | 7/2006 |

* cited by examiner

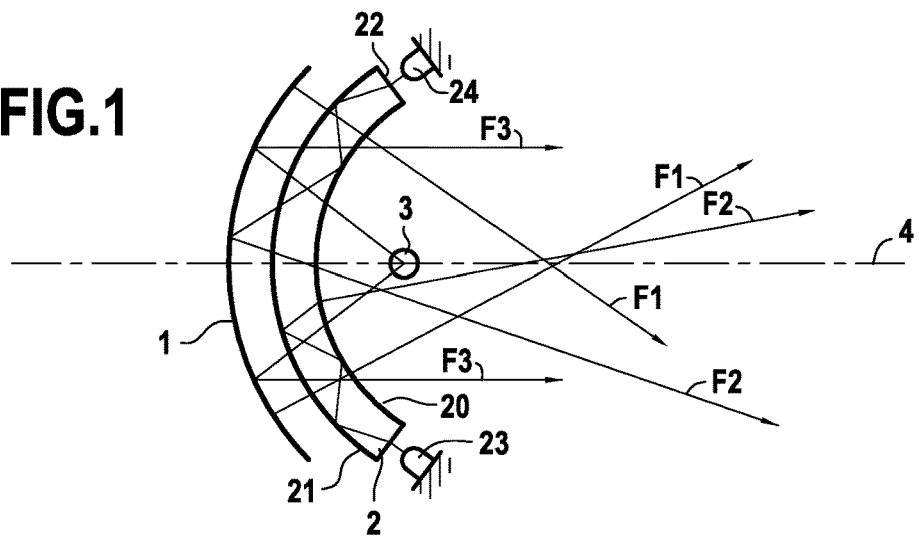
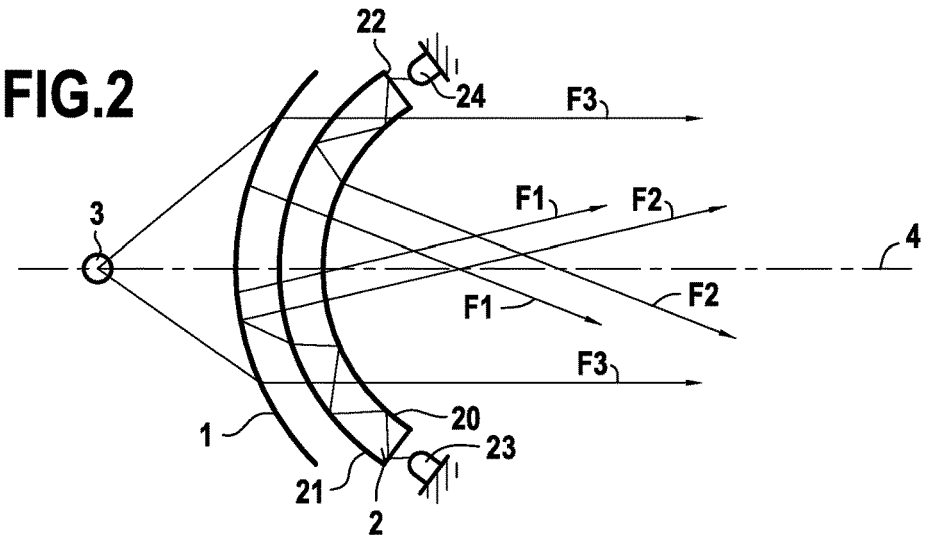
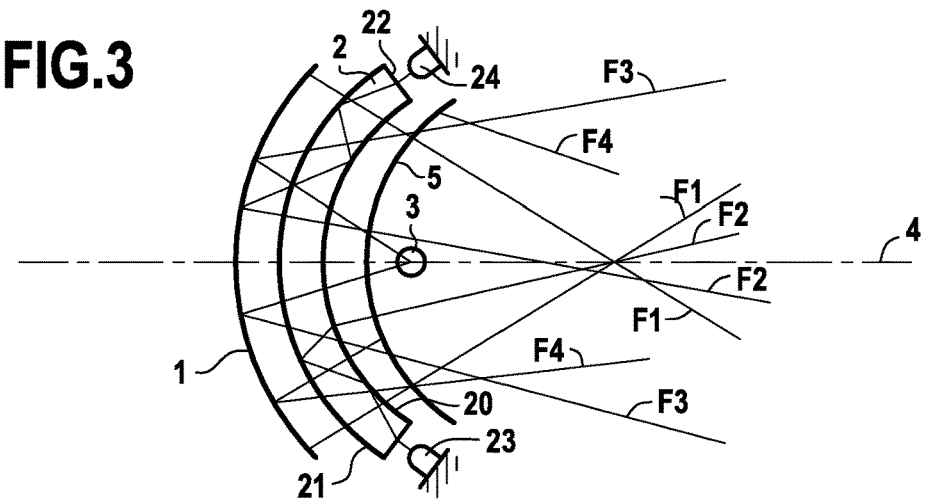

LIGHT DEVICE COMPRISING SURFACE LIGHT SOURCES

CROSS-REFERENCE TO RELATED APPLICATIONS

This application claims priority to the French application 1462929 filed Dec. 19, 2014, which application is incorporated herein by reference and made a part hereof.

BACKGROUND OF THE INVENTION

1. Field of the Invention

The invention relates to a light device for a motor vehicle, suitable for emitting at least one first light beam and one second light beam.

2. Description of the Related Art

A motor vehicle has to provide various lighting and/or signaling functions and notably high beam lighting, low beam lighting, fog beam lighting, diurnal lighting, position indication, direction change indication, reversing indication, braking indication, fog indication. Moreover, there is also a wide range of light functions that the vehicle has to perform within its very interior, such as, for example, a reading light or ambient lighting.

It is known practice to use light sources of surface type to produce these light functions. "Surface source" should be understood to mean a source having an emission surface with a width and/or length that is much greater than the thickness of the source, for example greater than ten times the thickness of the source. These surface sources make it possible to avoid obtaining a spot or even linear visual appearance that the light sources of generally spot type such as LEDs confer. "Spot light source" should be understood to mean a non-extended light source, of small dimensions, even negligible dimensions, for example with a light-emitting surface area of 1 mm$^2$.

It is common practice to combine, in one and the same light device of a vehicle, a number of these light functions, whether for the high beam lighting, the vehicle indication functions or the lighting of the interior. Now, the known solutions require the light sources producing these functions to be juxtaposed, which poses a problem of compactness of the light device in the case of surface-type light sources.

There is thus a need to produce a number of light functions using one and the same light device which is compact and with a surface-type visual appearance when lit.

SUMMARY OF THE INVENTION

The invention thus aims to meet this need.

To this end, the invention proposes a light device, notably for lighting and/or signaling, for a motor vehicle, suitable for emitting at least one first light beam and one second light beam, the device comprising a first surface light source and a second surface light source, in which:

the first surface source is suitable for emitting first light rays toward the second surface source, the second surface source being arranged so that these first rays pass through it to participate in the first light beam, and the second surface source is suitable for emitting second light rays, these second rays participating in the second light beam.

If so desired, the light device has an optical axis, directed from the back to the front of the device and the first surface source is arranged behind the second surface source on the optical axis. In this case, at least some of the first and second light rays are emitted respectively by the first and the second surface source along the optical axis.

It will therefore be understood that the light device makes it possible to produce two light functions via the same extended optical surface and therefore to be compact.

Advantageously, the first and second light beams are emitted along a same optical axis, that is to say in a same overall direction of emission.

According to one embodiment of the invention, the first surface source is totally reflecting. For example, the first surface source can have a rear wall provided with a reflecting coating, for example of aluminum.

As a variant, the first surface source can be semi-reflecting. For example the first semi-reflecting surface source can be suitable for reflecting only light rays of wavelength chosen from first predetermined wavelengths. In other words, the light rays of wavelength different from the first predetermined wavelengths can pass through the first surface source.

In this case, the second surface source can be suitable for emitting second light rays toward the first surface source, the first surface source being arranged so as to reflect these second light rays toward the second surface source and the second surface source being arranged so that these second light rays pass through it to participate in the second light beam. If appropriate, the second surface source is arranged to emit second light rays of wavelength chosen from the first predetermined wavelengths.

As a variant, the first semi-reflecting surface source can be suitable for reflecting only some, notably 50%, of a light ray reaching it, the other portion of this light ray passing through it.

According to another embodiment of the invention, the first surface source is transparent or translucent. Advantageously, the device comprises a reflector arranged behind the first surface source.

In this case, the second surface source can be suitable for emitting second light rays toward the first surface source, the light device being arranged so that the second light rays pass through the first surface source, are reflected by the reflector and pass successively through the first surface source and the second surface source to participate in the second light beam.

According to one embodiment of the invention, the second surface source is transparent or translucent.

As a variant, the second surface source can be semi-reflecting and for example suitable for reflecting only light rays of wavelength chosen from second predetermined wavelengths and in which the first surface source is arranged to emit first light rays of wavelength different from the second predetermined wavelengths. As a variant, the second semi-reflecting surface source can be suitable for reflecting just some, notably 50%, of a light ray reaching it, the other portion of this light ray passing through it.

Advantageously, the first surface source is an organic light-emitting diode. For example, the first surface source can have a multilayer structure comprising a rear electrode, an organic layer suitable for emitting first light rays when the first surface source is electrically powered and a front electrode. The front and rear electrodes can be made of a transparent material, for example of indium-tin oxide (also called ITO). When the first surface source is totally reflecting, the rear electrode is provided with a reflecting coating, for example a layer of aluminum with a thickness greater than 50 nm, notably with a thickness of between 50 and 100 nm. As a variant, the rear electrode can itself be made from a reflecting material. In the case of a first semi-reflecting surface source, the rear electrode can be provided with a semi-reflecting coating, for example a layer of aluminum with a thickness less than 50 nm forming a dichroic mirror.

According to one feature of the invention, the second surface source is an organic light-emitting diode. When the second surface source is transparent or translucent, the front and rear electrodes can be made from a transparent material, for example from indium-tin oxide.

As a variant, the second surface source comprises at least one generally spot light source associated with a surface light guide having a light output surface, the surface of emission of the second surface source being formed by the light output surface of the guide. For example, the surface light guide can comprise a light input face facing which is arranged the generally spot light source, for example a light-emitting diode, an output face and guiding faces. In this case, the light guide is arranged so that the light emitted by the generally spot light source penetrating into the light guide through the input face is propagated by total internal reflection on the guiding faces to the output face. The light guide can be provided with decoupling optical elements arranged so that the light propagated in the light guide exits from the light guide through the output face to form the second light rays.

If so desired, the first and second surface sources are less than five millimeters apart, notably less than two millimeters apart. Advantageously, the first and second surface sources are curved. For example, the first and second surface sources can each have a generally cylindrical form, notably guiding, that is to say of straight section, substantially of parabolic form.

According to one embodiment of the invention, the device is suitable for emitting a third light beam. Advantageously, the device comprises a third light source suitable for emitting third light rays, these third light rays participating in the third light beam.

According to a feature of the invention, the third source can be arranged behind the first surface source and can be suitable for emitting third light rays toward the first surface source so that these third light rays pass successively through the first surface source and the second surface source to participate in the third light beam.

As a variant, the third source is arranged in front of the second surface source and is suitable for emitting third light rays toward the second surface source so that these third rays pass through the second surface source, are reflected by the first surface source and pass successively through the first surface source and the second surface source to participate in the third light beam.

Also as a variant, the third source is arranged in front of the second surface source and is suitable for emitting third light rays toward the second surface source so that these third rays pass successively through the second surface source and the first surface source, are reflected by a reflector and pass successively through the first surface source and the second surface source to participate in the third light beam.

If so desired, the third light source can be a third surface light source, for example of organic light-emitting diode type or of light guide type. Advantageously, the third surface source can be curved and have a form similar to those of the first and second surface sources.

In another embodiment, the third light source can be a third generally spot light source. If appropriate, the third light source can be arranged at the focus of the parabolic base line of the first surface source and/or of the second surface source.

Optionally, the device can comprise a stack of surface light sources.

According to one embodiment of the invention, the first light source is arranged so that the first light beam participates in the production of a first regulatory photometric function, for example a position light. If appropriate, the second light source is arranged so that the second light beam participates in the production of a second regulatory photometric function, distinct from the first regulatory photometric function, for example a direction indicator.

These and other objects and advantages of the invention will be apparent from the following description, the accompanying drawings and the appended claims.

BRIEF DESCRIPTION OF THE ACCOMPANYING DRAWINGS

The invention will be better understood from the following description of different embodiments of the invention, with reference to the attached drawings in which:

FIG. 1 represents a diagram of a first embodiment of the optical device;

FIG. 2 represents a diagram of a second embodiment of the optical device; and

FIG. 3 represents a diagram of a third embodiment of the optical device.

DETAILED DESCRIPTION OF THE PREFERRED EMBODIMENTS

Right away, it will be noted that the corresponding elements of the different embodiments bear the same references. The front and the rear respectively designate the right side and the left side in FIGS. 1 to 3.

FIG. 1 shows an optical device of a motor vehicle, according to a first embodiment of the invention. It comprises a first rear surface light source 1, a second front surface light source 2 and a third spot light source 3 arranged along the optical axis 4 of the optical device.

In the embodiment of FIG. 1, the first rear surface light source 1 is an organic light-emitting diode, also called OLED, and the second front surface light source 2 comprises a light guide associated with two primary, generally spot light sources or diodes 23, 24.

The two surface light sources 1 and 2 have generally the same form and the same dimensions in height (in the vertical direction in FIG. 1) and in width (in the direction orthogonal to the cutting plane of FIG. 1), as represented in FIG. 1. In the embodiment of FIG. 1, the surfaces of the two surface light sources 1 and 2 are curved. More specifically here, the two surface light sources 1 and 2 are of cylindrical form with a straight section that would be substantially parabolic. The two surface light sources 1 and 2 are juxtaposed one behind the other, and more specifically here stacked, or nested in one another, the distance separating the two surface light sources 1 and 2 being of the order of a millimeter.

The first rear surface light source or OLED 1 is a reflecting OLED and comprises a reflecting rear electrode, an organic layer suitable for emitting first light rays F1 toward the second rear surface light source or light guide 2 and a transparent front electrode (not represented). The rear and front electrodes and the organic layer extend over the entire surface of the OLED 1.

The surface light guide 2 is made of transparent plastic material, of PMMA (polymethylmethacrylate) or of PC (polycarbonate), with a thickness of between 2 and 10 millimeters. It comprises a front guiding face 20 and a rear guiding face 21 for guiding the light, substantially parallel to one another, and a perimeter or input edge 22 of rectangular form extending in a plane at right angles to the cutting plane of FIG. 1. The perimeter 22 constitutes a light input edge.

The two generally spot primary light sources or diodes 23, 24 are here light-emitting diodes, placed in line with the input edge 22 and are suitable for emitting light rays F2. As a variant, the diodes 23, 24 could be housed in cavities, or voids, formed at the edge of the light guide 2, in order to exploit the light flux emitted by the diodes 23, 24 to the maximum.

The front and rear guiding faces 20, 21 comprise decoupling optical elements, suitable for deflecting some of the rays guided inside the light guide 2 and for making them exit from the light guide 2 through the front and rear guiding faces 20 and 21. These diffusion elements are diffusing hollowed-out or protruding patterns formed on the front guiding face 20 and/or rear guiding face 21 face of the light guide 2. The patterns can for example be in the form of prisms hollowed out in the rear and/or front outer surface of the light guide 2. The dimensions of these hollows have an apparent surface area of 0.1 to 1 or 2 mm and a depth from a few hundred millimeters to a millimeter. For more details on such decoupling optical elements, the reader is urged to refer to the document EP1434000, which is equivalent to U.S. Publications 2004/0136203 and 2007/0008736 and to U.S. Pat. Nos. 7,111,970 and 7,278,768.

The spot light source 3 is placed on the optical axis 4 and emits light rays F3 toward the light guide 2.

When the first rear surface light source 1 is powered up, the other two light sources 2 and 3 being off, the rays emitted F1 by the surface light source 1 are transmitted toward the front through the transparent light guide 2 and produce a first photometric function at the guide output, for example a position light.

When the LEDs or diodes 23 and 24 are powered up, the other two light sources 1 and 3 being off, the light rays F2 emitted by each diode 23 and 24 penetrate into the light guide 2 through the input edge 22 and are propagated inside the light guide 2 by successive total reflections on the front and rear guiding faces 20 and 21. These successive reflections are interrupted when the rays F2 encounter a decoupling optical element. These rays F2, after incidence on a decoupling optical element, are reflected toward one of the front guiding face 20 or rear guiding face 21 so that they exit from the light guide 2 through this face. Thus, some of the rays F2 exit from the light guide 2 through the front guiding face 20 and rear guiding face 21, after having encountered a decoupling element.

A first portion of these outgoing rays F2 exit directly toward the front through the front guiding face 20. A second portion of these outgoing rays F2 exit toward the rear through the rear guiding face 21 then are reflected toward the front by the reflecting electrode of the OLED 1 and pass through the light guide 2. Thus, most of the rays F2 exiting from the light guide 2 through the front guiding face 20 and rear guiding face 21 produce a second photometric function at the output of the light guide 2, for example a direction indicator.

When the LED light source 3 is powered up, the two surface light sources 1 and 2 being off, light rays F3 emitted by the LED light source 3 and impacting on the surface light guide 2 pass through the latter then are reflected toward the front by the reflecting electrode of the OLED 1. The reflected rays F3 pass once again through the surface light guide 2 and thus produce a third photometric function at the output of the light guide 2, for example a reversing light.

Optionally, a portion of the light rays F3 can be reflected toward the front by the front guiding face 20 or the rear guiding face 21 of the surface light guide 2.

The optical device comprises a control module (not represented) intended to activate the different light sources 1, 2 and 3 independently of one another so as to produce the three photometric functions independently. As a variant, it would be possible to provide for at least two sources out of the three to be activated simultaneously.

The different light sources 1, 2 or 3 can emit radiations of different respective wavelengths and therefore of different respective colors. Furthermore, the spot light sources 23 and 24 associated with the light guide 2 can also be of different colors.

A second embodiment represented in FIG. 2 differs from the first embodiment represented in FIG. 1 in that the spot light source 3 is placed behind the first rear surface light source 1, to the left thereof in FIG. 2. Furthermore, the first rear surface light source 1 is semi-reflecting. "Semi-reflecting" should be understood to mean that the first rear surface light source 1 has a semi-reflecting coating of dichroic type on its rear electrode which reflects only some predetermined wavelengths and allows the others to pass. In the particular embodiment described here, the first rear surface source 1 is suitable for reflecting the wavelength or wavelengths, or almost all of the wavelengths, emitted by the second front surface light source 2 and for allowing the wavelength or wavelengths emitted by the rear LED or spot light source 3 to pass. For example, the LED or spot light source 3 emits radiations of the wavelength corresponding to the orange color and the first rear surface light source 1 is suitable for allowing the wavelength corresponding to the orange color to pass and for reflecting the other wavelengths.

In this case, when the other two light sources 1 and 2 are off and the LED or spot light source 3 is on and emits light rays F3 of orange color toward the front, these rays F3, or most of them, pass through the first rear surface light source 1 then the front light guide 2 to produce the third photometric function of orange color.

When the LEDs 23 and 24 are powered up they emit white light rays F2 which penetrate into the surface light guide 2 through the input edge 22. A first portion of these rays F2 exit from the light guide 2 through the front guiding face 20 and a second portion of these rays exit from the light guide 2 through the rear guiding face 21. The rays F2 exiting toward the rear are reflected by the semi-reflecting coating of the rear surface light source 1. Once reflected, the rays F2 no longer contain the wavelength corresponding to the orange color. However, the reflected light remains quasi-white. The duly reflected rays F2 pass through the front light guide 2 to produce the second photometric function of white color.

To produce the first photometric function, the rear surface light source 1 is powered up, the two light sources 2 and 3 being off, as in the first embodiment.

A third embodiment represented in FIG. 3 differs from the first embodiment represented in FIG. 1 in that the device comprises a fourth surface light source 5, placed between the surface light guide 2 and the LED 3. The surface light source 5 is a transparent organic light-emitting diode, suitable for allowing the rays from the other light sources 1, 2 and 3 of the device to pass and for emitting light rays F4 both toward the front and toward the rear of the device.

When the first rear surface source 1 is powered up, the other sources 2, 3 and 5 being off, the rays F1 emitted by the OLED light source 1 are transmitted toward the front and pass successively through the light guide 2 then the organic light-emitting diode 5 to produce the first photometric function.

When the LEDs 23 and 24 are powered up, the light sources 1, 3 and 5 being off, the rays F2 from the LEDs 23 and 24 (or most of them) are propagated inside the light guide 2 and a portion of them exit from the light guide 2 through the front guiding face 20 and rear guiding face 21, after having encountered a decoupling element. The rays F2 exiting toward the rear are reflected toward the front by the surface light source 1 and pass through the light guide 2 then the surface light source 5 to produce the second photometric function.

When the light source 3 is powered up, the surface light sources 1, 2 and 5 being off, the rays F3 impacting on the fourth front surface light source 5 pass through the latter, then the light guide 2 then are reflected by the first rear surface light source 1 toward the front and pass once again successively through the light guide 2 then the fourth front surface light source 5 to produce the third photometric function.

Finally, when the fourth surface light source 5 is powered up, the light sources 1, 3 and 23 and 24 being off, a portion of the rays F4 are emitted toward the front and a portion of the rays F4 are emitted toward the rear. The portion of the rays F4 emitted toward the rear pass through the light guide 2 then are reflected by the first rear surface light source 1 toward the front and pass once again successively through the light guide 2 then the fourth front surface light source 5 to produce the fourth photometric function.

Obviously, the invention which has been described is not limited to the exemplary embodiments described in the Figures. The surface sources could be planar or of a different curved form, for example in the form of a portion of a sphere. The surface sources of the device could be of different respective forms and/or dimensions.

It would be possible to envisage other embodiments comprising a number N of surface light sources juxtaposed one behind the other, N being able to be greater than or equal to three.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light device, notably for lighting and/or signaling, for a motor vehicle, suitable for emitting at least one first light beam and one second light beam, the light device comprising a first surface light source and a second surface light source, in which:

said first surface light source is suitable for emitting first light rays (F1) toward said second surface light source, said second surface light source being arranged so that said first light rays pass through said second surface light source to participate in said at least one first light beam, and said second surface light source is suitable for emitting second light rays (F2), said second light rays (F2) participating in said second light beam wherein said first surface light source is at least one of totally reflecting or semi-reflecting so that it reflects said second light rays (F2) emitted by said second surface light source;

wherein each of said first surface light source and said second surface light source is curved, and wherein said second surface light source comprises a generally spot light source associated with said second surface light source having a light output surface, a surface of emission of said second surface light source being formed by said light output surface of a light guide.

2. The light device as claimed in claim 1, in which said second surface light source is suitable for emitting said second light rays (F2) toward said first surface light source, said first surface light source being arranged so as to reflect said second light rays toward said second surface light source and said second surface light source being arranged so that said second light rays pass through it to participate in said second light beam.

3. The device as claimed in claim 2, in which said second surface light source is transparent or translucent or semi-reflecting.

4. The light device as claimed in claim 2, in which said first surface light source is an organic light-emitting diode.

5. The device as claimed in claim 1, in which said second surface light source is transparent or translucent or semi-reflecting.

6. The light device as claimed in claim 1, in which said first surface light source is an organic light-emitting diode.

7. The device as claimed in claim 1, in which said first surface light source and said second surface each have a generally cylindrical form.

8. The light device as claimed in claim 1, said light device being suitable for emitting a third light beam, in which said light device comprises a third light source suitable for emitting third light rays (F3), said third light rays participating in said third light beam.

9. The light device as claimed in claim 8, in which said third light source is an organic light-emitting diode.

10. The light device as claimed in claim 8, in which said third light source is arranged behind said first surface light source and is suitable for emitting said third light rays (F3) toward said first surface light source so that said third light rays pass successively through said first surface light source and said second surface light source to participate in said third light beam.

11. The light device as claimed in claim 10, in which said third light source is an organic light-emitting diode.

12. The light device as claimed in claim 8, in which said third light source is arranged in front of said second surface light source and is suitable for emitting said third light rays (F3) toward said second surface light source so that said third rays pass through said second surface light source, are reflected by said first surface light source and pass successively through said first surface light source and said second surface light source to participate in said third light beam.

* * * * *